(12) United States Patent
Miller et al.

(10) Patent No.: US 11,796,068 B2
(45) Date of Patent: Oct. 24, 2023

(54) NEEDLE TIP AND SEAT FOR A CHOKE VALVE

(71) Applicant: Cameron International Corporation, Houston, TX (US)

(72) Inventors: Scott A. Miller, Katy, TX (US); Ghulam A. Barkatally, Spring, TX (US); Jerry A. Martino, Houston, TX (US); Declan Elliott, Longford (IE); Edmund Peter McHugh, Longford (IE); Jonathan Marshall, Springville, UT (US); David Hoyle, Salt Lake City, UT (US); Neil Cannon, Woodland Hills, UT (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 18/069,313

(22) Filed: Dec. 21, 2022

(65) Prior Publication Data
US 2023/0129538 A1   Apr. 27, 2023

Related U.S. Application Data

(63) Continuation of application No. 17/090,878, filed on Nov. 5, 2020, now Pat. No. 11,549,593, which is a (Continued)

(51) Int. Cl.
*F16K 1/54* (2006.01)
*E21B 34/00* (2006.01)
(Continued)

(52) U.S. Cl.
CPC ............ *F16K 1/54* (2013.01); *E21B 34/00* (2013.01); *F16K 1/385* (2013.01); *F16K 1/42* (2013.01);
(Continued)

(58) Field of Classification Search
CPC ... F16K 1/54; F16K 1/385; F16K 1/42; F16K 1/487; F16K 1/52; F16K 25/005; F16K 37/005; E21B 34/00
See application file for complete search history.

(56) References Cited

U.S. PATENT DOCUMENTS 2,575,658 A   11/1951   Del Nero
3,480,037 A   11/1969   Alexander, Jr.
(Continued)

FOREIGN PATENT DOCUMENTS

EP   0520566 A1   12/1992
EP   0520567 A1   12/1992

OTHER PUBLICATIONS

Hot Isostatic Pressing, Nuts and Bolts, New Hampshire Materials Laboratory Inc, Oct. 1, 1999, pp. 1-5, vol. 11, http://www.nhml.com/hot-isostatic-pressing/.

*Primary Examiner* — Patrick C Williams
(74) *Attorney, Agent, or Firm* — Matthew Goode

(57) ABSTRACT

Embodiments of the present disclosure relate to a choke valve that includes a choke body, a choke trim disposed in the choke body, where the choke trim is configured to adjust a cross-sectional area of a flow path in the choke body to adjust a fluid flow through the choke valve, a needle of the choke trim disposed in the flow path of the fluid flow, where the needle includes a first portion having a superhard material, a seat of the choke trim, where the needle is configured to move along an axis extending through an opening of the seat to adjust the fluid flow through the choke valve.

9 Claims, 6 Drawing Sheets

Related U.S. Application Data continuation of application No. 15/665,190, filed on Jul. 31, 2017, now Pat. No. 10,830,359.

(51) Int. Cl.
| | | |
|---|---|---|
| *F16K 1/52* | (2006.01) | |
| *F16K 25/00* | (2006.01) | |
| *F16K 1/42* | (2006.01) | |
| *F16K 37/00* | (2006.01) | |
| *F16K 1/48* | (2006.01) | |
| *F16K 1/38* | (2006.01) | |

(52) U.S. Cl.
CPC ............... *F16K 1/487* (2013.01); *F16K 1/52* (2013.01); *F16K 25/005* (2013.01); *F16K 37/005* (2013.01)

(56) References Cited

U.S. PATENT DOCUMENTS

| | | |
|---|---|---|
| 4,161,187 A | 7/1979 | Bauer |
| 4,503,878 A | 3/1985 | Taylor |
| 4,732,364 A | 3/1988 | Seger et al. |
| 4,736,766 A | 4/1988 | Bathrick et al. |
| 5,246,035 A | 9/1993 | Skyllingstad et al. |
| 5,538,028 A | 7/1996 | Lombardo |
| 6,820,857 B1 | 11/2004 | Lancaster |
| 7,419,002 B2 | 9/2008 | Dybevik et al. |
| 9,151,137 B2 | 10/2015 | Daigle |
| 2009/0155479 A1 | 6/2009 | Xiao et al. |
| 2012/0330466 A1 | 12/2012 | Rodger |
| 2021/0054941 A1 | 2/2021 | Miller |

NEEDLE TIP AND SEAT FOR A CHOKE VALVE

CROSS-REFERENCE TO RELATED APPLICATION

This application is a continuation of U.S. application Ser. No. 17/090,878, filed Nov. 5, 2020, which is a continuation of U.S. application Ser. No. 15/665,190, filed Jul. 31, 2017, granted as U.S. Pat. No. 10,830,359, both entitled "Needle Tip and Seat for a Choke Valve," which are hereby incorporated by reference in their entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In certain fluid-handling systems, such as mineral extraction systems, a variety of flow control devices are used to control a flow rate, a pressure, and other parameters of fluid flow. For example, in mineral extraction systems, choke valves may be utilized to regulate the flow of production fluid (e.g., oil, gas, and water) from a well. An actuator drives a movable valve member over an opening through which the fluid flows. Shifting the position of the movable valve member relative to the opening adjusts the flow rate of the fluid through the opening. Unfortunately movable valve members may be subject to relatively high pressure drop environments, abrasive media entrained in the fluid, and/or fluid flow cavitation, which may lead to wear, erosion, and other degradation.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
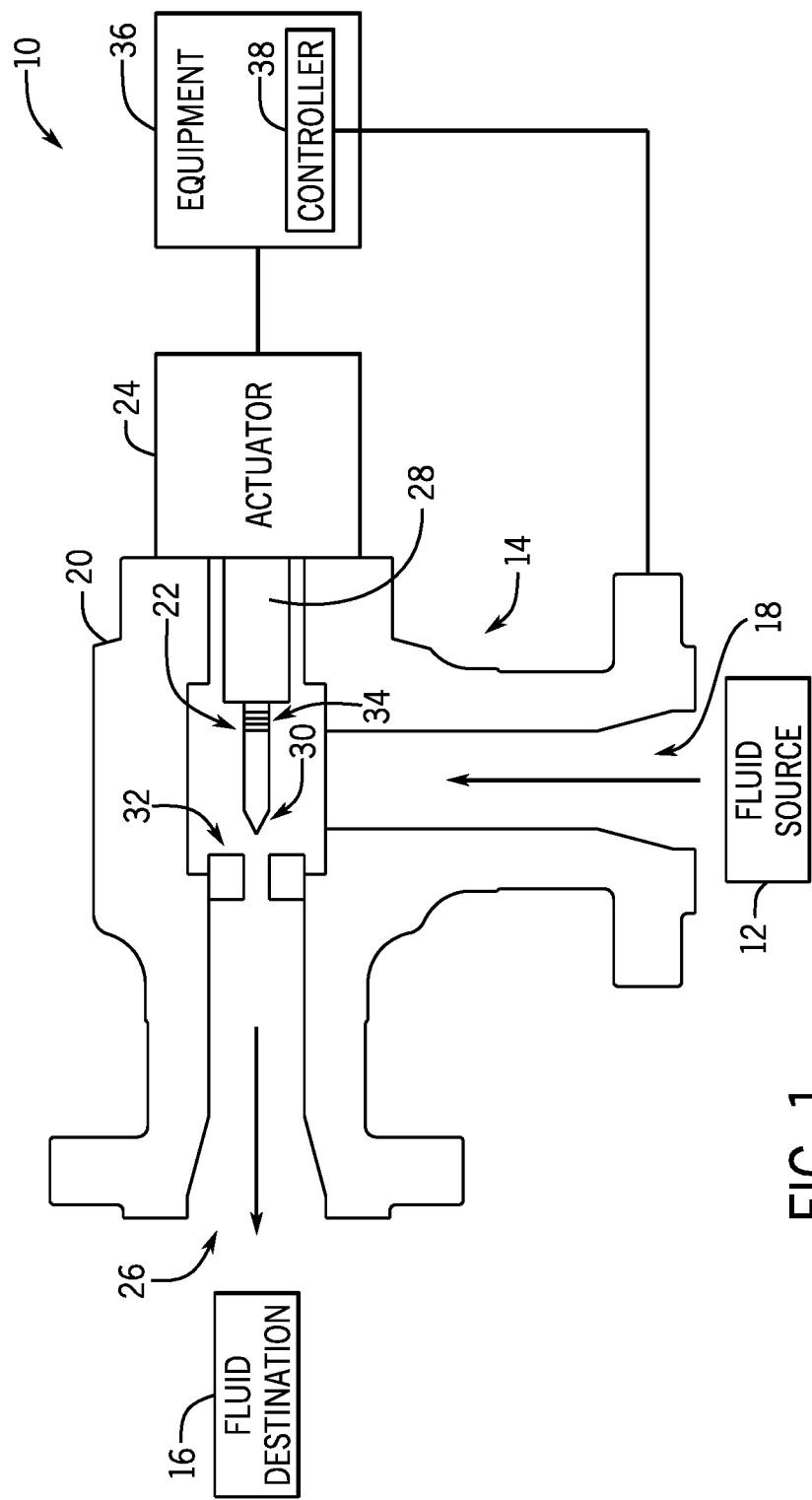
FIG. 1 is a schematic of a fluid-handling system including a choke valve, in accordance with an embodiment of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof.

Embodiments of the present disclosure are directed toward fluid-handling systems, such as a fluid-handling system for a mineral extraction system (e.g., drilling systems, hydraulic fracturing systems, among others). Fluid-handling systems may include a choke valve that includes a choke body and a choke trim disposed within the choke body. The choke trim may include a needle configured to move relative to an opening in the choke valve to adjust a fluid flow through the choke valve. Movement of the needle may be limited by a seat of the choke trim, and when the needle contacts the seat, the opening may be completely covered, such that no fluid flows through the choke valve. The choke trim may also include a stem coupled to an actuator that may be configured to move the needle with respect to the opening and/or the seat, thereby adjusting a cross-sectional area of a fluid flow path extending through the choke body to adjust the fluid flow. In some cases, the needle and/or the seat may incur degradation (e.g., erosion) and/or wear as a result of high pressure drops experienced at a tip portion of the needle. Traditional needle and seat choke trims may include a tungsten carbide material, which may be vulnerable to degradation, thereby leading to replacement of the choke trim after a relatively short duration.

Accordingly, it may be desirable to utilize a needle and seat choke trim that includes at least a tip portion having a superhard material (e.g., a diamond-based material, polycrystalline cubic boron nitride, a material with a hardness value exceeding approximately (e.g., within 1%-10%) 20 gigaPascals (GPa) based on the Vickers hardness test, and/or a material with a hardness value exceeding approximately (e.g., within 1%-10%) 4500 Hardness Brinell (HB) on the Brinell scale). However, due to manufacturing tolerances (e.g., size limitations) and/or cost constraints, a superhard material may not be included in the entire choke trim (e.g., the choke trim is not fully constructed of the superhard material). Therefore, it is now recognized that it may be desirable to include a superhard material in a tip portion of the needle and/or a seating surface of the seat of the choke trim.

As used herein, a superhard material may include a diamond-based material (e.g., silicon centered diamond, polycrystalline diamond, and/or another material that includes diamond), a polycrystalline cubic boron nitride, a material that includes a hardness value exceeding 20 GPa based on the Vickers hardness test, and/or a material that includes a hardness value exceeding 4500 HB on the Brinell scale. As a non-limiting example, the superhard material may include polycrystalline diamond compacts, polycrystalline diamond discs, and/or thermally stable products made commercially available by Shannon-Abrasives of Shannon, Ireland. In any case, the tip portion of the needle may include a superhard material that may enable the needle to better withstand high pressure drops experienced within the choke valve body when compared to traditional choke needles. Additionally, in some embodiments, at least a portion of a surface of the seat in which the needle contacts also includes the superhard material to resist wear resulting from contact between the needle and the surface. Accordingly, a durability of the fluid-handling system may be enhanced.

To help illustrate the manner in which the present embodiments may be used in a system, FIG. 1 illustrates an embodiment of a fluid-handling system 10. The fluid-handling system 10 may be part of an energy-acquisition or processing system, e.g., a hydrocarbon-production or processing system, such as a subsea or surface oil or gas well. In some embodiments, the fluid-handling system 10 may be a gas-uplift system, a water-injection system, a water/steam/chemicals injection system, or other system for conveying fluids. The fluid-handling system 10 includes a fluid source 12, a choke valve 14, and a fluid destination 16. The fluid source 12 may include a variety of fluid sources, such as an oil or natural gas well. The fluid source 12 may supply a variety of fluids, such as air, natural gas, oil, water (steam or liquid), or combinations thereof. The fluid arriving from the source 12 may be at relatively high pressures, e.g., pressures greater than 500 psi, 1000 psi, 5000 psi, 10,000 psi, 15,000 psi, 20,000 psi, 25,000 psi, or 30,000 psi. Additionally, the pressure of the fluid arriving from the source 12 may be higher than the pressure at the fluid destination 16.

The choke valve 14 includes an inlet 18, a choke body 20 (e.g., a production choke body and/or a universal choke body), a choke trim 22 disposed within the choke body 20, an actuator 24, and a fluid outlet 26. The actuator 24 may modulate flow between the inlet 18 and the outlet 26 by adjusting the position of the choke trim 22 or a component of the choke trim 22 (e.g., a stem coupled to a needle) relative to a second component of the choke trim 22 (e.g., a seat of the choke trim 22) and/or the choke body 20. The component of the choke trim 22 (e.g., a needle) may adjust a cross-sectional area of a flow path of the fluid through the choke body, thereby adjusting the flow between the inlet 18 and the outlet 26. For example, the actuator 24 may be a manual actuator (e.g., a wheel), an electro-mechanical actuator (e.g., an electric drive or motor), a hydraulic actuator (e.g., a fluid driven actuator), a pneumatic actuator (e.g., a pressure drive actuator), or other suitable type of actuator. To adjust the position of the choke trim 22 or a component of the choke trim 22 (e.g., a stem and/or a needle), the actuator 24 may exert a translational force on a shaft 28 coupled to the actuator 24 and the choke trim 22 or a component of the choke trim 22.

As mentioned above, the choke trim 22 may include a needle 30 and a seat 32. In some embodiments, one or more springs 34 may be disposed between the needle 30 and the shaft 28 such that a biasing force is applied to the needle 30. The spring 34 may be any suitable biasing member, such as a series (e.g., stack) of tapered annular washers (e.g., Bellville washers), one or more coil springs (e.g., stacked or concentric springs), an elastic material (e.g., a ring made of rubber or elastomer), or any combination thereof. During movement of the choke trim 22 to a closed position in which the needle 30 is fully seated against the seat 32 (e.g., an annular seat), the spring 34 may reduce a load applied by the needle 30 to the seat 32 and/or reduce a load applied by the shaft 28 to the needle 30, thereby reducing wear on certain components of the choke valve 14. In other embodiments, the choke valve 14 may not include the springs 34.

As will be appreciated, additional equipment 36 may be coupled to the fluid-handling system 10 (e.g., the choke valve 14 and/or the actuator 24). For example, the equipment 36 coupled to the fluid-handling system 10 may including drilling equipment, fracking equipment, production equipment, and/or other suitable equipment. In certain embodiments, the additional equipment 36 may include a controller 38 configured to regulate operation of the actuator 24 based on the type of additional equipment 36 being used, based on operating conditions of the fluid-handling system 10 (e.g., a fluid flow rate through the choke valve 14, a pressure of the fluid flow within the choke body 20), and/or another suitable parameter of the fluid-handling system 10. While the present discussion is focused on utilizing the choke valve 14 with the fluid-handling system 10, it should be recognized that the disclosed embodiments of the choke valve 14 may be included in other suitable systems. For example, the choke valve 14 having a needle and/or a seat with a superhard material may be utilized in hydraulic fracturing systems, which may expose the choke valve 14 to abrasive fluids. As such, utilizing the embodiments of the choke valve 14 with such systems may enhance an operating life of the choke valve 14.

Figure 2:
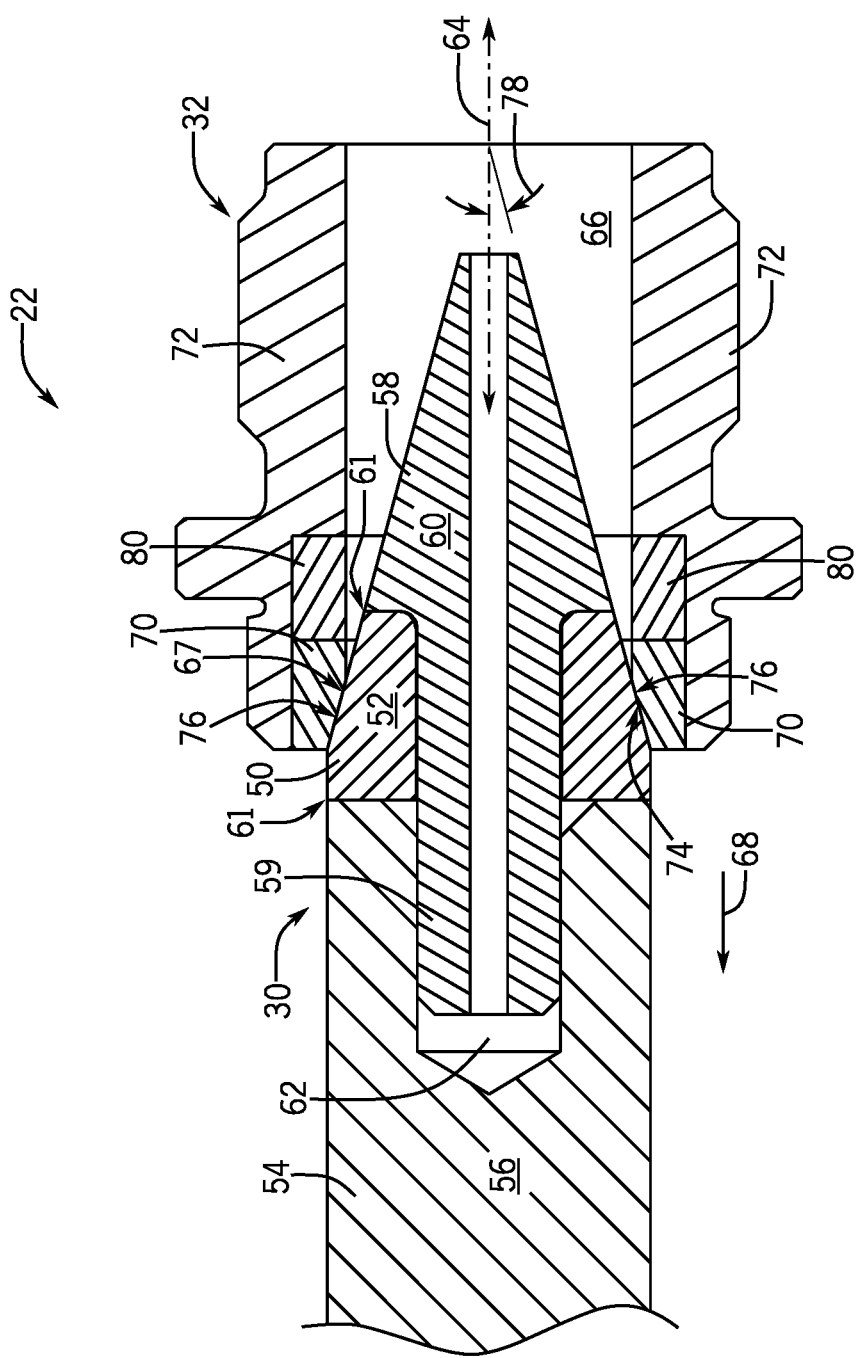
FIG. 2 is a cross-sectional side view of an embodiment of a choke trim of the choke valve of FIG. 1, in accordance with an embodiment of the present disclosure.

As discussed above, the choke trim 22 may experience relatively high pressure drops, thereby leading to degradation (e.g., wear) on components of the choke trim 22 (e.g., the needle 30). As shown in FIG. 2, the needle 30 may include a portion 50 (e.g., a first annular portion) that includes a first material 52 (e.g., a superhard material). The material 52 utilized in the portion 50 may include a superhard material (e.g., a diamond-based material, polycrystalline cubic boron nitride, a material with a hardness value exceeding approximately (e.g., within 1% and 10%) 20 GPa based on the Vickers hardness test, and/or a material with a hardness value exceeding approximately (e.g., within 1% and 10%) 4500 HB on the Brinell scale). In some embodiments, the superhard material may include an amount of diamond-based material (e.g., polycrystalline diamond) between 25% and 100%, between 50% and 95%, between 65% and 96%, or between 75% and 90% of a total weight of the material 52. Further, the portion 50 may include one or more segments to accommodate manufacturing tolerances that may limit the size of commercially available components that include superhard materials. However, it may be desirable to form a needle having a superhard material and configured to have generally the same size as a traditional needle. Accordingly, the enhanced needle 30 (e.g., having a superhard portion) may be installed in existing fluid-handling systems 10 without modification. In some embodiments, multiple segments (e.g., 2, 3, 4, 5, or more)

containing the superhard material may be used to form the enhanced needle 30 that is generally the same size as a traditional needle.

Additionally, the portion 50 may be coupled to a stem 54 (e.g., the stem 54 may be disposed upstream or downstream of the portion 50 relative to the flow path of fluid through the choke body 20) of the needle 30, which may include a second material 56 (e.g., a non-superhard material). In certain embodiments, the stem 54 may include a non-superhard material utilized in existing fluid-handling systems 10 such as a nickel alloy, tungsten carbide, steel (e.g., stainless steel), or another suitable material. Further, the needle 30 may include a portion 58 (e.g., a second annular portion) that includes a third material 60 (e.g., a non-superhard material) and couples the portion 50 to the stem 54. For example, the third material 60 may include nickel alloy, tungsten carbide, steel (e.g., stainless steel), or another suitable material. In other embodiments, the third material 60 may include a material that has a hardness between 5% and 99%, between 25% and 95%, or between 75% and 90% of a hardness of the material 52 of the portion 50. In any case, the portion 50 is disposed around a base 59 of the portion 58 to couple the portion 50 to the stem 54.

In some embodiments, seals 61 may be disposed between the portion 50, the portion 58 and/or the stem 54. As used herein, the seals 61 may include a washer, an "O"-ring, another sealing device that includes a metallic material and/or an elastomeric material, and/or a combination thereof. In certain embodiments, the seals 61 may include the first material 52, the second material 56, and/or another suitable material (e.g., metal and/or elastomeric material).

In some embodiments, the base 59 of the portion 58 is disposed in an opening 62 of the stem 54 and secures the portion 58 to the stem 54. For example, the base 59 may be secured into the opening 62 to block movement of the portion 58 (and thus the portion 50) with respect to the stem 54. In some embodiments, the base 59 is secured in the opening 62 via a shrink fit. As such, a temperature of the stem 54 may be increased to increase a size of the opening 62, such that the base 59 can be disposed within the opening 62. Subsequently, the temperature of the stem 54 is reduced after disposing the base 59 in the opening 62, such that a size of the opening 62 reduces and the opening 62 contracts around the base 59, such that movement of the portion 58 (and thus the portion 50) is blocked relative to the opening 62. In other embodiments, the base 59 may be secured in the opening 62 using threads on the base 59 that engage with corresponding threads in the opening 62 (see, e.g., FIG. 5). In still further embodiments, the base 59 may be secured into the opening 62 using any other suitable technique (e.g., brazing, welding, adhesives, among other techniques).

As shown in the illustrated embodiment of FIG. 2, the needle 30 may move along an axis 64, such that the needle 30 adjusts a size of an opening 66 extending through the seat 32. For example, a flow of fluid may be substantially blocked when the needle 30 contacts a surface 67 of the seat 32 because the opening 66 may be substantially sealed by the needle 30. Conversely, the flow of fluid increases as the needle 30 moves along the axis 64 away from the seat 32 (e.g., as shown by arrow 68). In some cases, contact between the needle 30 and the surface 67 of the seat 32 may degrade and/or wear the seat 32 over time. Thus, in some embodiments, the seat 32 may include a portion 70 (e.g., a third annular portion) that has a superhard material to reduce degradation and/or wear caused by contact between the surface 67 and the needle 30. In some embodiments, the portion 70 may be an annular disc that is coupled to a body portion 72 (e.g., an annular body portion) of the seat 32. In some embodiments, the portion 70 is secured within the body portion 72 via shrink fitting. In other embodiments, the portion 70 may be coupled to the body portion 72 through brazing, welding, adhesives, threads, or another suitable technique.

The portion 50 of the needle 30 may include a tapered surface 74 (e.g., a first annular tapered surface) that is configured to facilitate a seal between the needle 30 and the seat 32. Additionally, the portion 70 of the seat 32 may include a corresponding tapered surface 76 (e.g., a second annular tapered surface) that engages with the tapered surface 74 to form the seal. In some embodiments, the tapered surface 74 and/or the tapered surface 76 form an angle 78 with the axis 64 along which the needle 30 moves. For example, the angle 78 may be between 1 and 45 degrees, between 2 and 25 degrees, or between 5 and 10 degrees. In any case, the angle 78 may facilitate a seal between the needle 30 and the seat 32 when the needle 30 is disposed within the opening 66 of the seat 32.

Further, the seat 32 may include a portion 80 (e.g., a fourth annular portion) that is also secured within the body portion 72 of the seat 32. The portion 80 may include a non-superhard material that is different from, or the same as, a material of the body portion 72. As a non-limiting example, in some embodiments, the portion 80 includes tungsten carbide and the body portion 72 includes stainless steel. In other embodiments, the portion 80 and the body portion 72 each include tungsten carbide and/or stainless steel. Including the portion 80 in the seat 32 may enhance a robustness of the seat 32 because the portion 80 is exposed to high temperatures and high pressure drops that degrade and/or wear the seat 32. Thus, including the portion 80 that has a robust material may increase an operating life of the seat 32, thereby reducing operating costs and maintenance times associated with of the fluid handling assembly 10.

Figure 3:
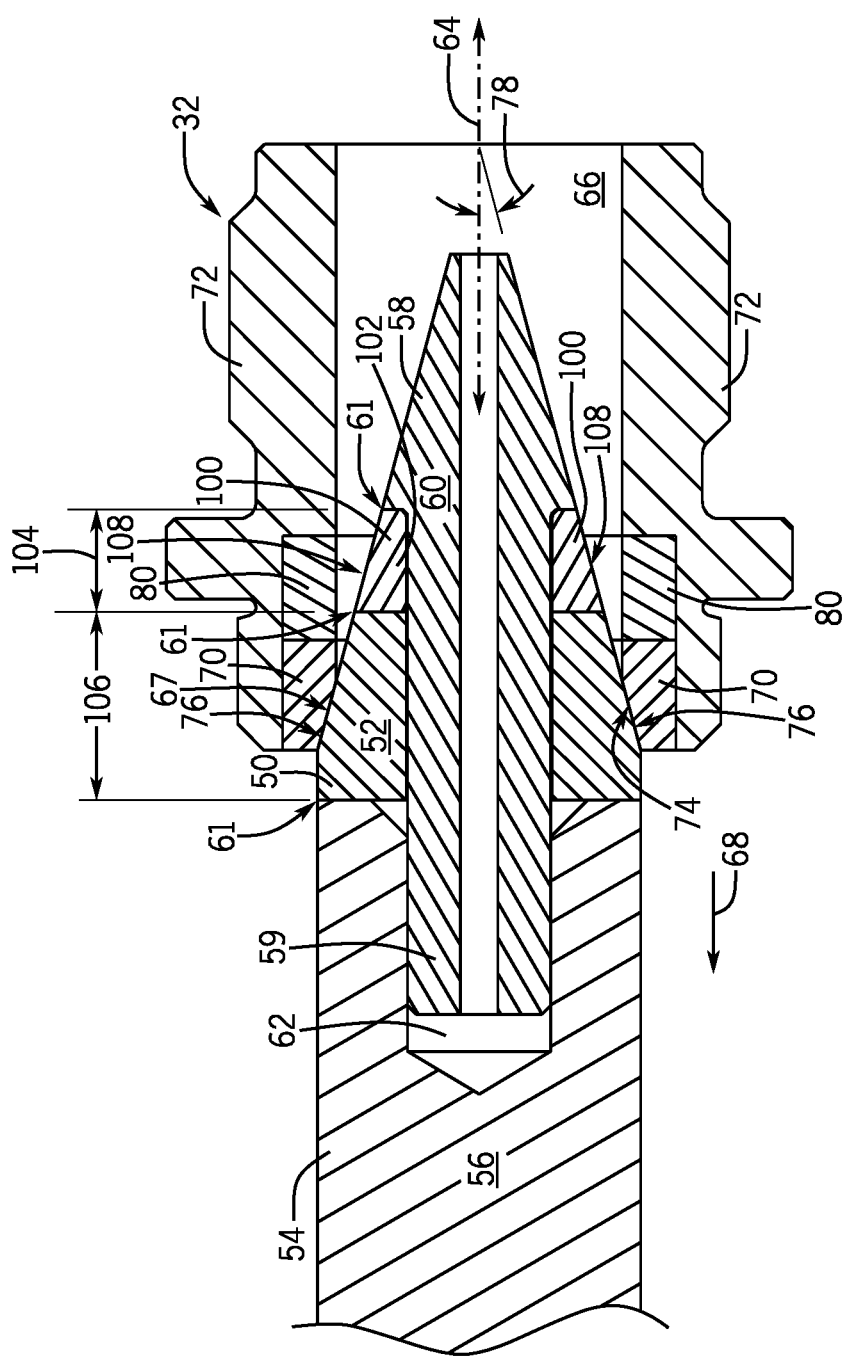
FIG. 3 is a cross-sectional side view of an embodiment of the choke trim of the choke valve of FIG. 1, in accordance with an embodiment of the present disclosure.

FIG. 3 is a cross-sectional side view of an embodiment of the choke trim 22, where the needle 30 includes a portion 100 (e.g., a fifth annular portion) in addition to the portions 50 and 58. The portion 100 may include a material 102 (e.g., a non-superhard material) that is the same as, or different from, the portions 50 and/or 58. In some embodiments, the material 102 may include tungsten carbide, stainless steel, another suitable material, or a combination thereof. In other embodiments, the material 102 may include a nanoparticle coating (e.g., diamond nanoparticle coating, gold nanoparticle coating, silver nanoparticle coating, titanium nanoparticle coating, or a combination thereof) that is applied to tungsten carbide, stainless steel, another suitable material, or a combination thereof. In still further embodiments, the material 102 may include a treated surface (e.g., a heat treated surface) and/or any other suitable material. Further, the material 102 may include a hardness that is between 5% and 99%, between 25% and 95%, or between 75% and 90% of a hardness of the material 52.

In any case, the portion 100 may be utilized to further enhance an operating life of the needle 30. For example, the material 102 may include a hardness that is greater than the material 60 of the portion 58. As shown in the illustrated embodiment of FIG. 3, the portion 100 is positioned adjacent to the portion 50, which contacts the seat 32 and ultimately forms the seal between the needle 30 and the seat 32. Accordingly, the portion 100 may also experience relatively high temperatures and high pressure drops. Further, the portion 100 may be exposed to fluids that have relatively high concentrations of particles, thereby causing degradation and/or wear via abrasion. Accordingly, the portion 100 may provide a harder, more robust material in an area that is exposed to relatively harsh conditions to enhance an operating life of the needle 30. For example, the portions 58 and 100 may be exposed to fluid after the portion 50. Thus, while the portion 50 at least partially blocks the portions 58 and 100 from the harsh conditions in the fluid handling assembly 10, the portions 58 and 100 may include a more robust material that may better withstand the high particle concentrations, high temperatures, and/or high pressure drops. The longer the portions 58 and 100 withstand any abrasion caused by the fluid, the longer the needle 30 may sufficiently provide a seal in the opening 66 without maintenance and/or repair.

As shown in the illustrated embodiment of FIG. 3, the portion 100 may include a thickness 104 that is less than a thickness 106 of the portion 50. In some embodiments, the thickness 104 of the portion 100 is between 10% and 50%, between 15% and 40%, or between 20% and 35% of the thickness 106 of the portion 50. In other embodiments, the thicknesses 104 and 106 may be substantially equal to (e.g., within 10%, within 5%, or within 1% of) one another. Additionally, in some embodiments, the portion 100 includes a tapered surface 108. The tapered surface 108 may facilitate insertion of the needle 30 into the opening 66 of the seat 32 and enable contact between the portion 50 and the surface 67 of the seat 32. Accordingly, the portion 50, which may include a more robust material than the portion 100, contacts the surface 67 of the seat 32 and reduces wear on the needle 30.

Figure 4:
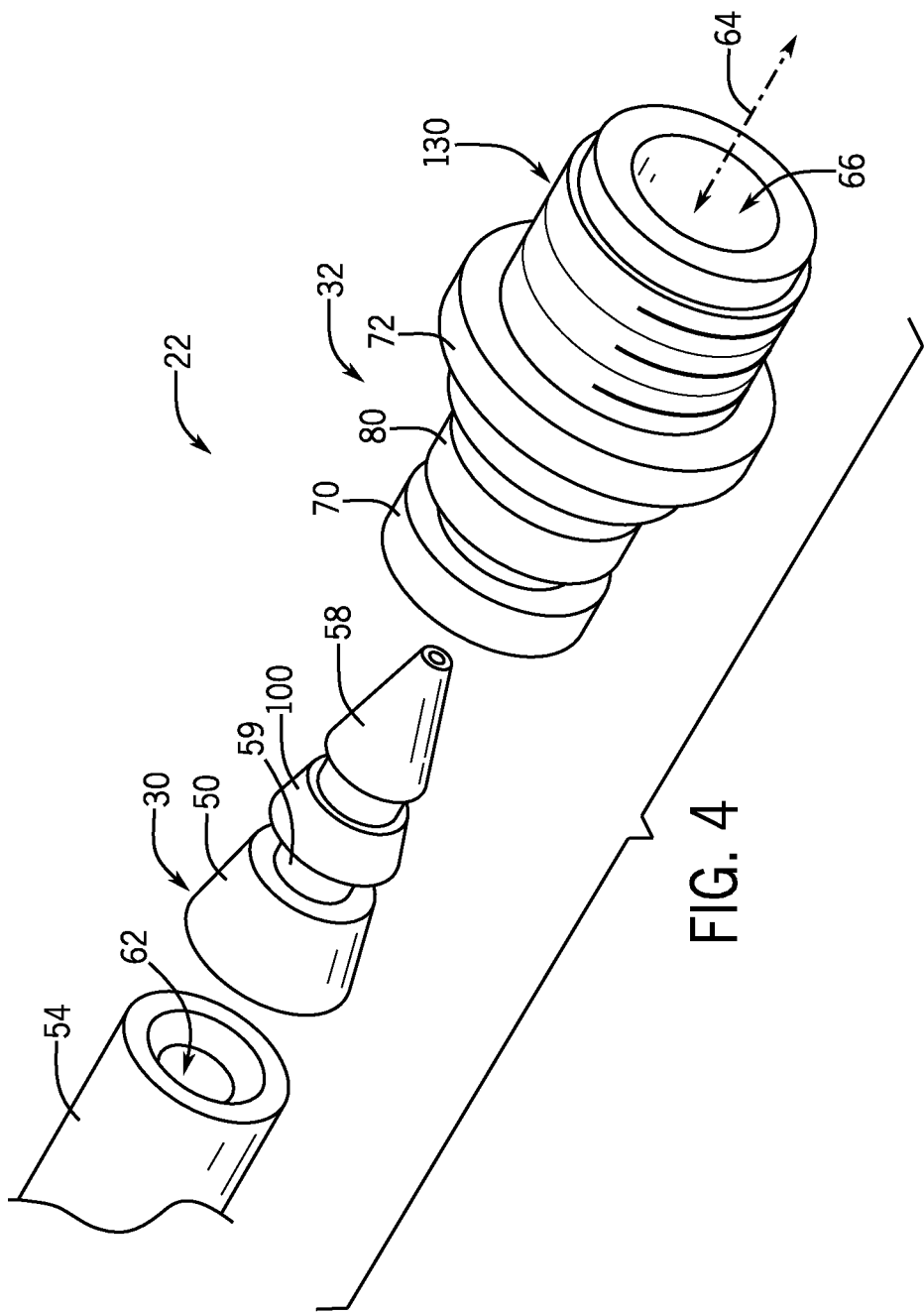
FIG. 4 is a perspective view of an embodiment of the choke trim of the choke valve of FIG. 3, in accordance with an embodiment of the present disclosure.

FIG. 4 is an exploded perspective view of the choke trim 22 of FIG. 3. As shown in the illustrated embodiment of FIG. 4, the portions 50 and 100 are disposed around the base 59 of the portion 58 to form the needle 30. The base 59 is configured to be inserted into the opening 62 of the stem 54 and secured to the stem 54, such that the needle 30 and the stem 54 do not move relative to one another.

As discussed above, the actuator 24 is configured to move the stem 54 (e.g., via the shaft 28) along the axis 64, such that the needle 30 moves along the axis 64 toward and away from the seat 32. As shown in the illustrated embodiment of FIG. 4, the seat 32 includes the opening 66 that is configured to receive the needle 30 (e.g., the portions 50, 58, and 100). Further, the portions 70 and 80 of the seat 32 are secured within the body portion 72 of the seat 32 to form the seating surface 67 (e.g., a surface in which the needle contacts). The body portion 72 of the seat 32 may include threads 130 that engage with corresponding threads of the choke body 20 of the choke valve 14. Accordingly, the seat 32 may be secured within the choke body 20, such that the needle 30 moves along the axis 64 with respect to the choke body 20 and the seat 32.

Figure 5:
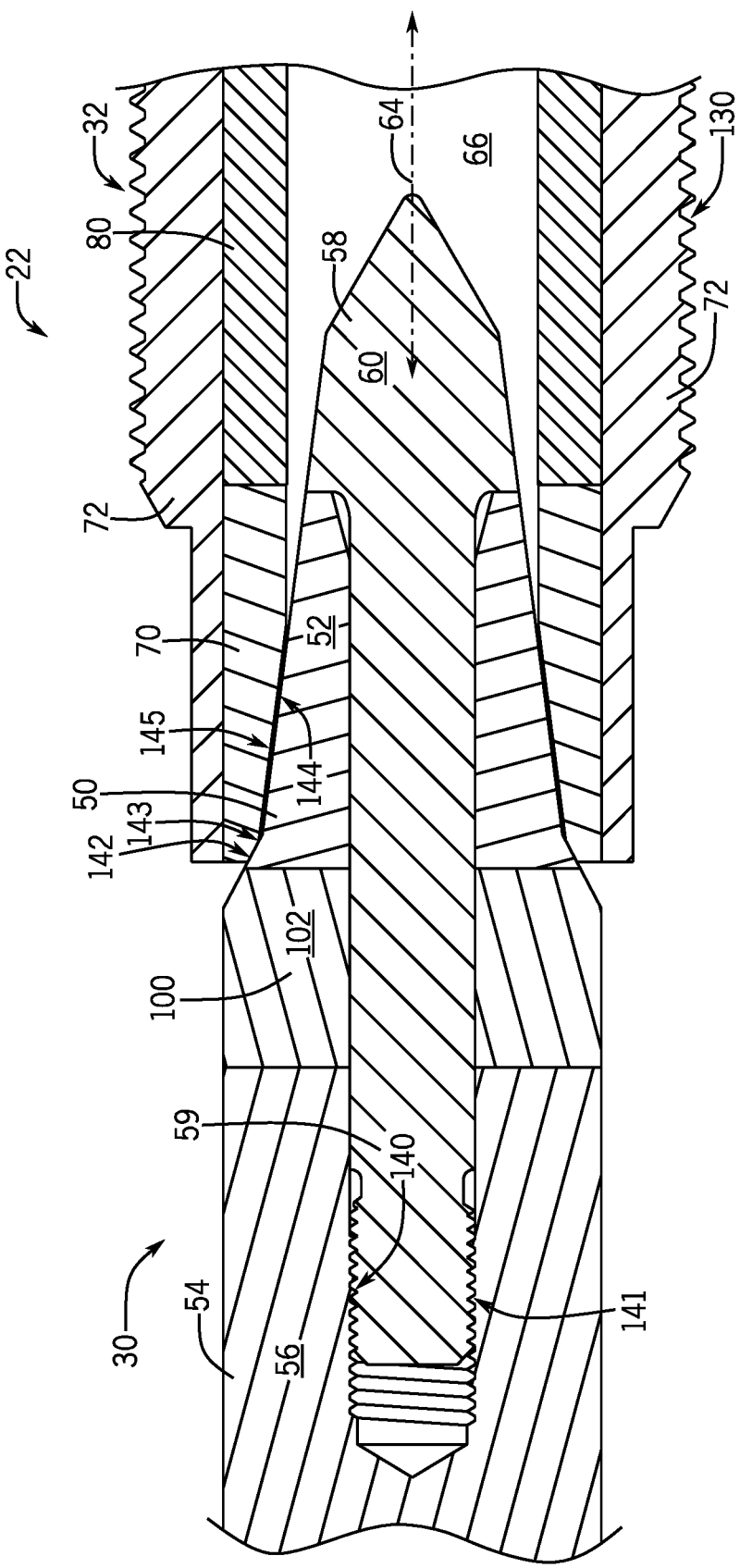
FIG. 5 is a cross-sectional side view of an embodiment of the choke trim of the choke valve of FIG. 1, in accordance with an embodiment of the present disclosure.

FIG. 5 is a cross-sectional view of an embodiment of the choke trim 22, where the body portion 59 is coupled to the stem 54 via threads 140 of the body portion 59 that engage corresponding threads 141 of the stem 54. As such, the body portion 59 is secured into the stem 54 via the threads 140 and 141. Utilizing the threads 140 and 141 may enable the body portion 59 to be secured within the stem 54 without undergoing a shrink fit procedure, which may facilitate assembly of the choke trim 22.

Additionally, as shown in the illustrated embodiment of FIG. 5, a position of the portion 100 and the portion 50 may be reversed when compared to the embodiments of FIGS. 3 and 4. Thus, the portion 50 may still engage one or more of the portions 70 and/or 80 of the seat 32, while the portion 100 may be exposed to fluid (e.g., abrasive fluid) before the portion 50 (e.g., the portion 100 is positioned upstream of the portion 50 with respect to a flow of the fluid through the choke valve 14). As discussed above, the portion 100 may include a material 102 (e.g., a non-superhard material) that is the same as, or different from, the portions 50 and/or 58. In some embodiments, the material 102 may include tungsten carbide, stainless steel, another suitable material, or a combination thereof. In other embodiments, the material 102 may include a nanoparticle coating (e.g., diamond nanoparticle coating, gold nanoparticle coating, silver nanoparticle coating, titanium nanoparticle coating, or a combination thereof) that is applied to tungsten carbide, stainless steel, another suitable material, or a combination thereof. In still further embodiments, the material 102 may include a treated surface (e.g., a heat treated surface) and/or any other suitable material. Further, the material 102 may include a hardness that is between 5% and 99%, between 25% and 95%, or between 75% and 90% of a hardness of the material 52. As set forth above, the portion 50 may include the material 52, which may be a superhard material.

In some embodiments, the portion 50 may include a first segment 142 configured to engage a first surface 143 of the portion 70 disposed in the body portion 72 of the seat 32. Further, the portion 50 includes a second segment 144 that conforms to and/or engages with a second surface 145 of the body portion 72. However, in other embodiments, the portion 50 may include a single segment or more than two segments (e.g., tapered surfaces having different angles with respect to the axis 64).

Figure 6:
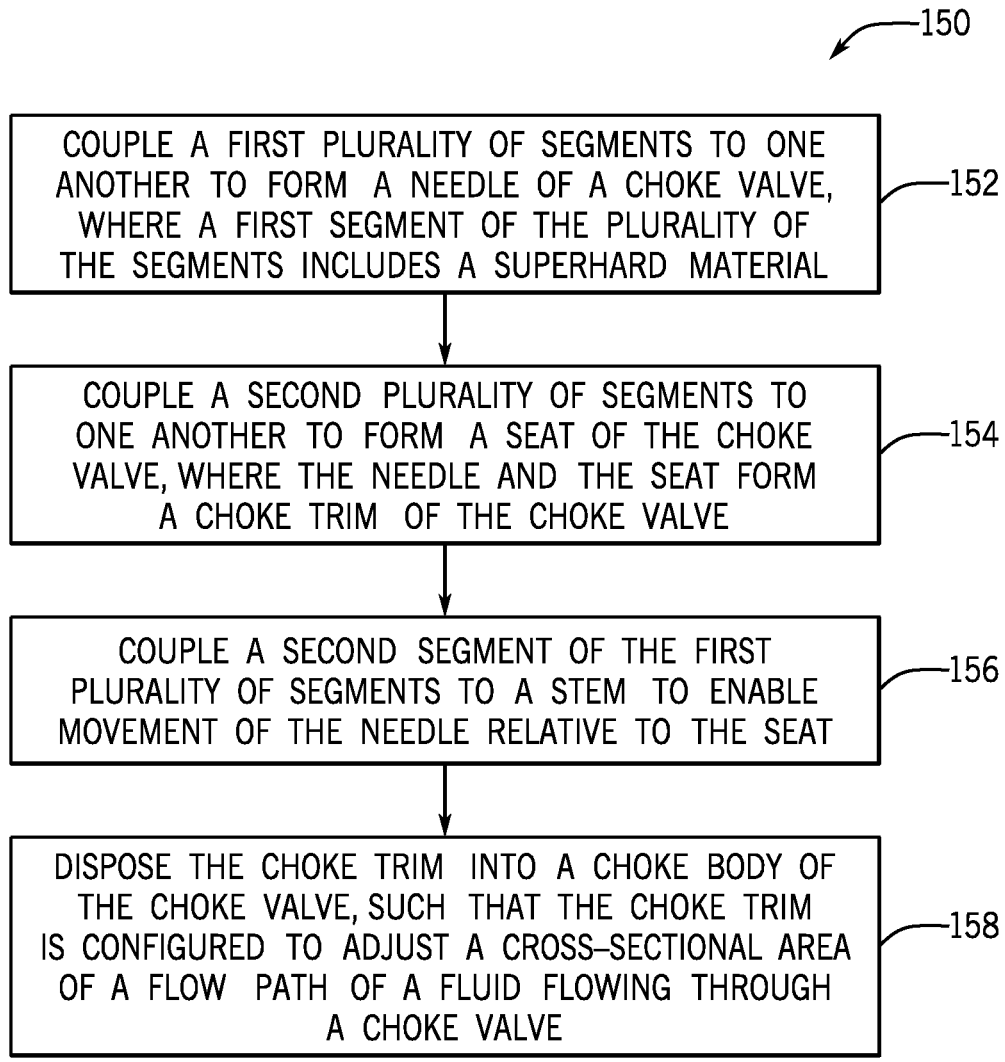
FIG. 6 is a block diagram of an embodiment of a process for assembling the choke trim of the choke valve of FIGS. 1-5, in accordance with an embodiment of the present disclosure.

FIG. 6 is a block diagram of a process 150 that may be used to manufacture one or more of the previously discussed embodiments of the choke trim 22. For example, at block 152 a first plurality of segments (e.g., the portion 50, the portion 58, and/or the portion 100) may be coupled to one another to form the needle 30 of the choke trim 22. As discussed above, one or more of the plurality of segments (e.g., the portion 50, the portion 58, and/or the portion 100) may include the material 52 (e.g., a superhard material). At block 154, a second plurality of segments (e.g., the portion 70, the body portion 72, and/or the portion 80) may be coupled to one another to form the seat 32. For example, the portion 70 and the portion 80 are disposed within the opening 66 of the body portion 72 and secured in the body portion 72 (e.g., via shrink fitting, welding, brazing, etc.) to form the surface 67 in which the needle 30 contacts to form a seal. Additionally, at block 156, the stem 54 may be coupled to the body 59 of the portion 58, such that the needle 30 is configured to move along the axis 64 (e.g., via the actuator 24) relative to the seat 32. In some embodiments, the stem 54 may a non-superhard material, such as tungsten carbide, stainless steel, or another suitable material. The body 59 of the portion 58 may be secured within the opening 62 of the stem 54 via shrink fitting, threads, brazing, welding, and/or any other suitable technique. Further, at block 158, the choke trim 22 may be disposed in the choke body 20 such that the choke trim 22 may be utilized to adjust a cross-sectional area of a flow path of the fluid flowing through the choke valve 14.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is to cover all modifications, equivalents, and alternatives falling within the spirit and scope of the disclosure as defined by the following appended claims.

The invention claimed is:

1. A system, comprising:
   a needle valve, comprising:
   a stem;
   a first portion having a first bore, wherein the first portion comprises a first superhard material configured to open and close against a valve seat;
   a second portion configured to extend through the first bore and couple the first and second portions to the stem;
   wherein an outer surface of the first portion comprises a first tapered annular surface having a first angle relative to a central axis, a second tapered annular surface having a second angle relative to the central axis, and the first and second angles are different from one another;
   wherein the valve seat has a second superhard material and is disposed in a recess of a body portion having a fluid flow passage; and
   an additional portion disposed in the recess adjacent the valve seat, wherein the additional portion has a hardness lesser than the second superhard material and greater than the body portion.

2. The system of claim 1, wherein the first superhard material extends continuously about an outer annular surface of the first portion configured to open and close against an inner annular surface of the valve seat.

3. The system of claim 1, wherein the first portion is one-piece made of the first superhard material and extending around the first bore.

4. The system of claim 1, wherein the first superhard material comprises a polycrystalline diamond.

5. The system of claim 1, wherein a tapered annular surface extends along both the first and second portions.

6. The system of claim 1, wherein the second superhard material extends continuously about an inner annular surface of the valve seat configured to open and close against an outer annular surface of the first portion of the needle valve.

7. The system of claim 1, wherein the valve seat is one-piece made of the second superhard material and extending about an inner annular surface of the valve seat.

8. The system of claim 1, wherein an inner surface of the valve seat comprises a first tapered annular surface having a first angle relative to a central axis.

9. The system of claim 8, wherein the inner surface of the valve seat comprises a second tapered annular surface having a second angle relative to the central axis, and the first and second angles are different from one another.

* * * * *